United States Patent [19]
Fujii et al.

[11] Patent Number: 5,473,016
[45] Date of Patent: Dec. 5, 1995

[54] MATTE FILM OR SHEET AND METHOD FOR PREPARING SAME

[75] Inventors: Koichi Fujii, Yokosuka; Koichi Komaki, Yokohama; Shigeki Komori, Sagamihara; Minoru Tajima, Yokohama, all of Japan

[73] Assignee: Nippon Petrochemicals Co., Ltd., Japan

[21] Appl. No.: 274,632

[22] Filed: Jul. 13, 1994

Related U.S. Application Data

[63] Continuation-in-part of Ser. No. 865,290, Apr. 8, 1992, abandoned.

[30] Foreign Application Priority Data

| Apr. 9, 1991 | [JP] | Japan | 3-103847 |
| Aug. 5, 1991 | [JP] | Japan | 3-219150 |
| Aug. 5, 1991 | [JP] | Japan | 3-219151 |

[51] Int. Cl.$^6$ .............. C08J 5/18; C08L 51/06; C08K 3/00; C08K 5/00
[52] U.S. Cl. .............. 525/74; 525/71; 525/73; 525/78; 525/79; 525/80; 525/88; 525/221; 525/222; 525/227; 525/240; 525/196; 528/503; 524/505; 524/436; 524/425; 524/343; 524/528; 264/348
[58] Field of Search ............. 525/240, 221, 525/222, 227, 88, 71, 73, 74, 78, 79, 80; 524/528, 524

[56] References Cited

U.S. PATENT DOCUMENTS

| 4,742,106 | 5/1988 | Kamiya et al. |
| 4,748,206 | 5/1988 | Nogiwa et al. |
| 4,769,283 | 9/1988 | Sipinen et al. |

OTHER PUBLICATIONS

Union Carbide—Film Extrusion Materials—1984.

Kerutz—Plasticts & Rub. Int.—VLDPE—A new class of PE Apr. 1986 vol. 11 No. 2 pp. 35–37.

*Primary Examiner*—Carman J. Seccuro, Jr.
*Attorney, Agent, or Firm*—Ostrolenk, Faber, Gerb & Soffen

[57] ABSTRACT

A polyolefin-based matte film or sheet can be prepared from a polymeric blend of the preset invention comprising a propylene polymer or copolymer as component (A), a specific ethylene-α-olefin copolymer (EαO, so-called "super low-density polyethylene") as component (B), and a high-pressure radical polymerization process ethylene polymer or copolymer and/or a modified polyolefin-based resin as component (C). The above blend of the present invention may further comprise an inorganic filler as component (D) and a flame retardant as component (E). The matte films or sheets prepared from these polymeric blends are excellent in tensile modulus, flexibility, impact resistance, thermal resistance, laminating properties, flame resistance, chalking resistance, covering power, scratch resistance, and widely used for fabricating adhesive tapes, covers or cases for stationery, fashion bags, sheets for interior finish work in construction and automobile industries, and sheets for dressing steel plates.

11 Claims, 1 Drawing Sheet

1 : LLDPE
2 : ETHYLENE-$\alpha$-OLEFIN COPOLYMER
    (USED IN THE PRESENT INVENTION)
3 : EPR

MATTE FILM OR SHEET AND METHOD FOR PREPARING SAME

This is a continuation-in-part of application Ser. No. 07/865,290, filed Apr. 8, 1992, now abandoned.

BACKGROUND OF THE INVENTION

1. Field of the Invention

The present invention relates to a matte film or sheet. More particularly, the present invention relates to a matte film or sheet prepared from a specific polymeric blend. The matte film or sheet prepared by the specific method of the present invention has good matte properties, feel and flexibility; and is excellent in tensile modulus, laminating properties, impact resistance, and scratch resistance.

Further, the present invention relates to a matte film or sheet prepared from the polymeric blend which further comprises at least one of inorganic fillers and flame retardants. In this case, the matte film or sheet has further characteristics such as flame resistance, chalk resistance and covering power.

The matte films or sheets of the present invention can be widely used to fabricate various articles such as adhesive tapes, covers or cases for stationery, fashion bags, sheets for interior finish work in construction and automobile industries, and sheets for dressing steel plates.

2. Background Art

Until now, polyvinyl chloride (hereinafter also referred to as PVC) resins have been used for the preparation of matte films or sheets. Two main drawbacks of the PVC film or sheet are: 1) the blooming of plasticizer which can cause the deterioration of flexibility of the film or sheet; and 2) a large amount of HCl gas is evolved when subjected to combustion.

At present, such PVC matte films or sheets have been replaced by polyolefin-based films which have no such problem. Japanese Laid Open Publication No. 50-56451 discloses a process for preparing a polyolefin-based matte film or sheet prepared directly from a polyethylene having a specific melt flow rate (MFR) and a specific ratio of high-load MFR to low-load MFR by extruding or molding the polyethylene under specific conditions. Japanese Laid Open Publication No. 59-215343 discloses a process for blending an ethylene-vinylacetate copolymer resin (EVA) with a low-density ethylene-α-olefin copolymer (LLDPE). In this case, tensile modulus (a measure of the firmness of film), thermal resistance and covering power of the film or sheet are insufficient.

Further, Japanese Laid Open Publication No. H1-185306 discloses a copolymer of propylene with a vinyl trialkylsilane in an amount of the order of a few ppm. In this case, the films or sheets exhibit poor flexibility and covering power, although thermal resistance may be improved. Japanese Laid Open Publication No. H2-92944 describes a polypropylene-based matte sheet prepared from a polymeric blend of a polypropylene resin, a high-density super high-molecular weight polyethylene (HDPE), a super high-molecular weight elastomer, and an inorganic filler. According to the disclosure, tensile modulus, thermal resistance and covering power of the sheet are improved to some extent. However, the sheet still exhibits poor flame resistance, laminating properties, chalk and scratch resistance. Therefore, there is still a need for improvement in these poor properties.

U.S. Pat. No. 4,148,955 discloses a process for preparing a matte film by further blending glass balloon having an average particle diameter of 0.5 to 75 μm. GB 1,453,649 proposes an improved process for preparing a composite matte film having both surface layers made of an ethylene-propylene block copolymer. Further, GB 1,581,686 proposes a process for preparing a matte film by calendaring a resin using a pair of rolls revolving at different circumferential speeds. In these cases, productivity is low, and tensile modulus, flexibility, laminating properties and impact resistance are insufficient.

SUMMARY OF THE INVENTION

Accordingly, the principal object of the present invention is to provide a polyolefin-based matte film or sheet which does not have the above-described problems. The matte films or sheets of the present invention are good in feel, flexibility, and have an external appearance of high rank. Further, matte films or sheets of the invention are excellent in tensile modulus, impact and thermal resistance, laminating properties, flame resistance, chalk resistance, covering power, scratch resistance, and the like.

According to an aspect of the present invention, there is provided a matte film or sheet prepared from a polymeric blend comprising:

component (A): 10 to 80% by weight of a propylene polymer or copolymer having a MFR of 1–20 g/10 min., component (B): 5 to 30% by weight of an ethylene-α-($C_{3-12}$ olefin) copolymer satisfying the following conditions (I) to (IV):

(I) a density of 0.860 to 0.910 $g/cm^3$;

(II) a maximum peak temperature of not lower than 100° C. as measured by DSC (differential scanning calorimetry);

(III) an insoluble in boiling n-hexane content of not lower than 10% by weight; and (IV) a MFR of 0.1–2 g/10 min.; and component (C): 5 to 85% by weight of at least one component having a MFR of 0.1–2.0 g/10 min. which is selected from the group consisting of high-pressure radical polymerization process ethylene polymer and modified polyolefin resin of at least one monomer selected from the group consisting of a) carboxylic acid group-, carboxylic acid ester group- or carboxylic acid anhydride group-containing monomers, b) epoxy group-containing monomers, c) hydroxyl group-containing monomers, d) amino group-containing monomers, and e) alkenyl cyclic imino ether derivative monomers, wherein said matte film or sheet has a gloss (60°) of not more than 30%, the ratio of component (A) MFR to component (B) MFR is from 5 to 20, the ratio of component (A) MFR to component (C) MFR is from 5 to 30 and the difference in crystalline temperature of component (A) and component (B) and also component (A) and component (C) is not less than 5° C.

Other aspects may be described hereinafter with some preferred embodiments.

DETAILED DESCRIPTION OF THE PREFERRED EMBODIMENTS

Figure 1:
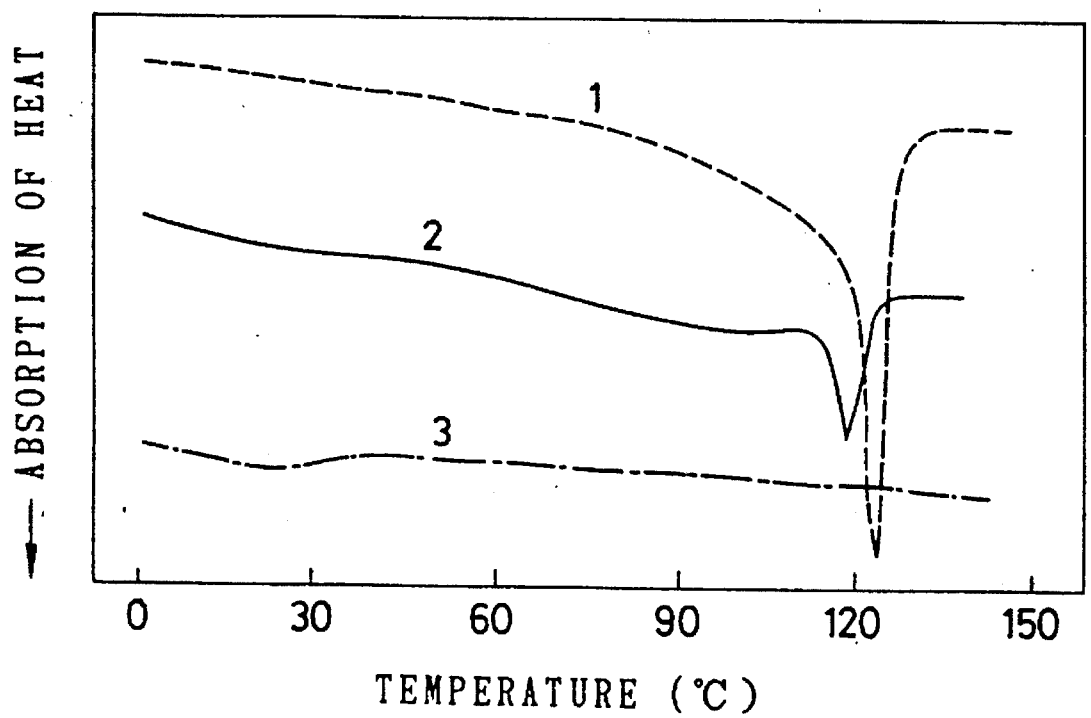
FIG. 1 is a diagram showing results of DSC measurement of ethylene (co)polymers.

Examples of propylene polymers or copolymers which can be used as component (A) according to the present invention include homopolymers of propylene; and block copolymers or random copolymers of propylene with another α-olefin. Among them, propylene-ethylene block copolymers are particularly preferred. The preferred MFR of the propylene polymer or copolymer is in a range from 1 to 20 g/10 min, more preferably 5 to 10 g/10 min.

Examples of other α-olefins which can be used include ethylene, 1-butene, 4-methyl-1-pentene, 1-hexene, 1-octene, 1-dodecene, and the like, with the preferred ones being ethylene and 1-butene.

The ethylene-α-olefin copolymer as component (B) according to the present invention is a polymer (hereinafter also referred to as EαO) having properties intermediate between the ones of a linear low-density polyethylene and an ethylene-α-olefin copolymer rubber, and has a density of 0.860 to 0.910 g/cm$^3$, a maximum peak temperature (Tm) measured by differential scanning calorimetry (DSM) of not lower than 100° C., and an insoluble content in boiling n-hexane of over 10% by weight. In addition, according to the present invention the MFR of the ethylene-α-olefin copolymer as component (B) is in a range from 0.1 to 2.0 g/10 min.

More specifically, the copolymer (EαO) as component (B) according to the present invention is a copolymer of ethylene with an α-olefin having 3 to 12 carbon atoms. In the copolymer (EαO) component (B), there exist both highly crystalline regions and amorphous regions. Therefore, the EαO is a special copolymer which possesses properties characteristic of both linear low-density polyethylenes (LLDPEs) and ethylene α-olefin copolymer rubbers. Examples of such properties include good mechanical properties and thermal resistance which are the features of LLDPEs, and self-adhesive, rubbery elasticity and impact resistance at low temperatures which are the features of amorphous polymers such as ethylene-α-olefin copolymer rubbers. Accordingly, EαOs are extremely useful for the preparation of a matte film or sheet according to the present invention.

Typical examples of α-olefins which can be used include propylene, 1-butene, 4-methyl-1-pentene, 1-hexene, 1-octene and 1-dodecene, and the like, with the most preferred one being 1-butene.

The preferred amount of the α-olefin in the ethylene-α-olefin copolymer is in a range from 5 to 40% by mole.

The EαO may be prepared in the presence of a catalyst system comprising a solid catalyst component containing at least Mg and Ti and an organic aluminum compound.

Examples of such solid catalyst component which can be used include a Ti compound supported on an Mg-based inorganic solid compound as carrier such as metallic Mg; magnesium hydroxide; magnesium oxide; magnesium salts such as magnesium chloride; double salts, double oxides, carbonates, chlorides or hydroxides containing an element selected from the group consisting of Si, Al, Ca and Mg atom as magnesium carbonate; or reaction products or treated products thereof by use of an oxygen-, sulfur-containing compound, an aromatic hydrocarbon or a halogen-containing compound.

Examples of the aforesaid oxygen-containing compound include, for example, water; oxygen-containing organic compounds such as alcohols, phenols, ketones, aldehydes, carboxylic acids, esters, polysiloxanes, and acid amides; oxygen-containing inorganic compounds such as metallic alkoxides and metal oxychlorides.

Examples of the sulfur-containing compound include organic sulfur-containing compounds such as thiols and thioethers; and inorganic sulfur-containing compounds such as sulfur dioxide, sulfur trioxide and sulfuric acid.

Examples of the aromatic hydrocarbon include monocyclic and multicyclic aromatic hydrocarbons such as benzene, toluene, xylenes, anthracenes, phenanthrenes.

Examples of the halogen-containing compound include chlorine, hydrogen chloride, metal chlorides, organic halides.

Examples of the Ti compound supported on the inorganic solid compound as a carrier containing Mg include halides, alkoxyhalides, alkoxides, and oxyhalides of Ti, with the preferred ones being $Ti^{+4}$ and $Ti^{+}$ compounds.

Typical examples of the $Ti^{+4}$ compound include ones represented by the formula, $Ti(OR)_n X_{4-n}$ (wherein R is an $C_{1-20}$ alkyl group, an aryl group or an aralkyl group, X is a halogen atom, and n is an integer which satisfies equation $0 \leq n \leq 4$) such as $TiCl_4$, $TiBr_4$, $TiI_4$, monomethoxytrichlorotitanium, dimethoxydichlorotitanium, trimethoxymonochlorotitanium, tertamethoxytitanium, monoethoxytrichlorotitanium, diethoxydichlorotitanium, triethoxymonochlorotitanium, tertaethoxytitanium, monoisopropoxytrichlorotitanium, diisopropoxydichlorotitanium, triisopropoxymonochlorotitanium, tertaisopropoxytitanium, monobutoxytrichlorotitanium, dibutoxydichlorotitanium, monopentoxytrichlorotitanium, monophenoxytrichlorotitanium, tetraphenoxytitanium, and the like.

Examples of the $Ti^+$ compound include $TiX_3$ obtained by reduction of $TiX_4$ such as $TiCl_4$ or $TiBr_4$ with hydrogen or an organometallic compound containing Al, Ti or a metal in Groups I–III of the periodic table.

Other examples of the $Ti^+$ compounds include $Ti^+$ compounds obtained by reduction of halogenated alkoxytitanium ($Ti^{+4}$) represented by the formula, $Ti(OR)_m X_{4-m}$ (wherein R is an alkyl group having 1 to 20 carbon atoms, aryl or aralkyl group, X is a halogen atom, and m is an integer which satisfies equation $0 \leq m \leq 4$) with an organometallic compound containing a metal in Groups I–III of the periodic table.

Among these Ti compounds, $Ti^{+4}$ compounds are particularly preferred. Other examples of the solid catalyst component which may be employed in the present invention include a reaction product of an organomagnesium compound such as Grignard compounds with a Ti compound.

Other examples of the solid catalyst component which may be employed include a solid substance obtained by contacting the aforesaid solid catalyst containing at least Mg and Ti with an inorganic oxide such as $SiO_2$ or $Al_2O_3$. Typical examples of the organoaluminum compound to be combined with the aforesaid solid catalyst component include $R_3Al$, $R_2AlX$, $RAlX_2$, $R_2AlOR$, $RAl(OR)X$, $R_3Al_2X_3$ (wherein R is the same or different and each R is an alkyl, aryl or aralkyl group having 1 to 20 carbon atoms, x is a halogen atom) such as triethylaluminum, triisobutylaluminum, trihexylaluminum, trioctylaluminum, diethylaluminum chloride, diethylaluminum ethoxide, ethyl aluminum sesquichloride, and mixtures thereof.

Any amount of the organoaluminum compound may be used, but the preferred amount is in a range from 0.1 to 1,000 moles based on the Ti compound.

The polymerization may be carried out in the same manner as in the conventional polymerization of an olefin in the presence of a Ziegler type catalyst. More particularly, the polymerization is conducted in a substantially oxygen and water-free atmosphere in a vapor phase or a liquid phase in the presence of an inert solvent or using monomer per se as solvent. The polymerization temperature is in a range from 20° to 300° C., preferably 40° to 200° C., and pressure is in a range from normal pressure to 70 Kg/cm$_2$G, preferably 2 to 60 Kg/cm$_2$G.

Although the molecular weight may be adjusted to some extent by changing polymerization conditions such as temperature or the molar ratio of the catalyst components, it is conveniently adjusted by the addition of hydrogen into the reaction system.

Of course, stepwise polymerization involving two or more different conditions in terms of hydrogen concentration or polymerization temperature may also be employed without any trouble.

As shown in FIG. 1, the ethylene-α-olefin copolymer (EαO) as component (B) according to the invention is distinguishable from the ethylene-α-olefin copolymer obtained by use of a conventional vanadium-based solid catalyst or a titanium-based solid catalyst component. When the (co)monomer and the density are the same, the Tm of a EαO measured by DSC is always higher than that of the latter, and the insoluble content of the EαO is over 10% by weight compared to that of trace or zero.

It is necessary that the ethylene-α-olefin copolymer as component (B) thus obtained exhibit the following properties:

(I) a density of 0.860 to 0.910 g/cm$^3$, preferably 0.880 to 0.905 g/cm$^3$, (II) a maximum peak temperature (Tm) measured by DSC of 100° C. or higher, (III) an insoluble in boiling n-hexane content of over 10% by weight, preferably in a range from 20 to 95% by weight, and (IV) a MFR of 0.1~2.0 g/10 min.

In the present invention, at least one of the components selected from the group consisting of high-pressure radical polymerization process ethylene polymers or copolymers and modified polyolefin-based resins is incorporated into the polymeric blend comprising components (A) and (B) to give or enhance the characteristics such as matte properties, mechanical strength, adhesiveness to metallic or plastic substrates.

The high pressure radical polymerization process ethylene polymer or copolymer when used as component (C) is one selected from the group consisting of conventional ethylene homopolymers, copolymers of ethylene as a main component with an α-olefin, copolymers of ethylene with an α,β-unsaturated carboxylic acid, its ester or metal salt, and ethylene-vinylester copolymers such as ethylene-vinylacetate copolymer.

Examples of the α,β-unsaturated carboxylic acid or its ester, and the vinyl ester include unsaturated carboxylic acids such as acrylic acid, methacrylic acid, maleic acid, fumaric acid, maleic anhydride, iraconic anhydride; unsaturated carboxylic acid esters such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, maleic acid monomethyl ester, maleic acid diethyl ester, fumaric acid monomethyl ester, glycidyl acrylate, glycidyl methacrylate; and vinyl esters such as vinyl propionate, vinyl acetate, vinyl caproate, vinyl laurate, vinyl stearate, vinyl trifluoroacetic acid, and the like. Among them, (meth-)acrylic acid alkyl esters are preferred, with the more preferred ones being ethyl acrylate and vinyl acetate. Mixtures thereof may be employed.

Typical examples of the aforesaid copolymers include ethylene-vinylester copolymers such as ethylene-acrylic acid copolymers, ethylene-methacrylic acid copolymers, ethylene-ethylacrylate copolymers, ethylene-ethylmethacrylate copolymers, ethylene-vinylacetate copolymers; ethylene-unsaturated carboxylic acid copolymers, ester or metal salt derivatives thereof such as ethylene-glycidyl methacrylate copolymers, ethylene-acrylic acid-ethylacrylate copolymers, ethylene-vinylacetate-ethylacrylate copolymers, ethylene-glycidylmethacrylate-ethylacrylate copolymers. Among them, ethylene-ethylacrylate copolymers and ethylene vinylacetate copolymers are particularly preferred. Mixtures thereof may be employed. When incorporated into the polymeric blend of the present invention together with the aforesaid specific resins, the MFR of the copolymer is in a range from 0.1 to 2.0 g/10 min, preferably 0.3 to 1.5 g/10 min.

Examples of the modified polyolefin resin, which is another component (C) and has been modified with at least one monomer selected from the group consisting of carboxylic acid group-, carboxylic acid ester group- or carboxylic acid anhydride group-containing monomers (a); epoxy group-containing monomers (b); hydroxy group-containing monomers (c); amino group-containing monomers (d); and alkenyl cyclic mono ether derivatives (e), include graft copolymers obtained by grafting at least one of these monomers on an polyolefin-based resin.

Examples of the aforesaid carboxylic acid group-, carboxylic acid ester group- or carboxylic acid anhydride group-containing monomer (a) include α,β-unsaturated carboxylic acids such as maleic acid, fumaric acid, citraconic acid, iraconic acid; unsaturated carboxylic acid such as acrylic acid, methacrylic acid, fumaric acid, crotonic acid, vinyl acetate, pentenic acid; and ester thereof or anhydrides thereof.

Examples of the aforesaid epoxy group-containing monomer (b) include glycidyl acrylate, glycidyl methacrylate, monoglycidyl itaconate, butene tricarboxylic acid monoglycidyl ester, butene tricarboxylic acid diglycidyl ester, butene tricarboxylic acid triglycidyl ester, and glycidyl esters of α-chloroallyl, maleic acid, crotonic acid or fumaric acid; glycidyl ethers such as vinyl glycidyl ether, allyl glycidyl ether, glycidyl oxyethyl vinyl ether, styrene-p-glycidyl ether; and p-glycidyl styrene, and the like. Among them, glycidyl methacrylate and allyl glycidyl ether are particularly preferred.

Examples of the aforesaid hydroxy group-containing monomer include 1-hydroxypropyl acrylate or methacrylate, 2-hydroxypropyl acrylate or methacrylate, hydroxyethyl acrylate or methacrylate, and the like.

Examples of the aforesaid amino group-containing monomer include tert.-amino group-containing monomers such as dimethylaminoethyl acrylate or methacrylate, diethylaminoethyl acrylate or methacrylate, and dibutylaminoethyl acrylate or methacrylate.

Examples of the aforesaid alkenyl cyclic imino ether derivatives include ones represented by the following general formula:

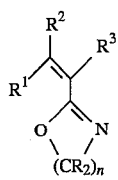

[wherein n is 1, 2 or 3, preferably 2 or 3, more preferably 2, each of $R^1$, $R^2$, $R^3$ and R is an inactive alkyl group having 1 to 12 carbon atoms and/or a hydrogen atom, each of the alkyl group may have an inactive substituent group]

The term "inactive" means the group does not have a bad influence upon the graft polymerization or the properties of the graft copolymer. The various R groups may be the same or different. Preferably, $R^1=R^2=H$, $R_3=H$ or Me, and R=H, that is, the preferred alkenyl cyclic imino ethers are 2-vinyl and/or 2-isopropenyl-2-oxazoline, and 2-vinyl and/or 2-isopropenyl-5,6-dihydro-4H-1,3-oxazine. Mixtures thereof may be employed. Among them, 2-vinyl and/or 2-isopropenyl-2-oxazoline is particularly preferred.

Examples of the aforesaid multifunctional monomer (f) include multifunctional methacrylate monomers such as trimethylolpropane trimethacrylate, ethylene glycol dimethylacryalte, diethylene glycol dimethacrylate; multifunctional vinyl monomers such as divinyl benzene, triallyl isocyanurate, diallyl phthalate, vinyl butyrate; bis-maleimides such as N,N'-m-phenylene-bis-maleimide, N,N'-ethylene-bis-maleimide; dioximes such as p-quinone dioxime, and the like.

The graft modification of an olefin-based polymer with at least one of said monomers may be carried out preferably in the presence of a curing agent.

Examples of the curing agent include organic peroxides such as hydroxyperoxides, dialkylperoxides, diacylperoxides, peroxyesters and ketone peroxides; curing agents selected from the group consisting of dihydroaromatic compounds and sulfur.

The polyolefin-based resin to be modified is not restricted, but preferred ones are soft polyolefin-based resins or crystalline resins such as polyethylene and polypropylene resins, with the most preferred ones being ethylene-α-olefin copolymers having a density of 0.91 to 0.87 g/cm³. The amount of the monomer to be grafted is in a range from 0.01 to 20% by weight, preferably 0.1 to 15% by weight, based on the amount of the resin components.

The most preferred modified polyolefins are maleic acid-modified polyethylenes.

In the present invention wherein the polymeric blend comprises components (A), (B) and (C), the amount of the polypropylene polymer or copolymer as component (A) is in a range from 10 to 80% by weight, the amount of the ethylene-α-olefin copolymer as component (B) is in a range from 5 to 30% by weight, and the amount of the high-pressure radical polymerization process ethylene polymer or copolymer and/or the modified polyolefin-based resin as component (C) is in a range from 5 to 85% by weight. When the amount of the component (A) is more than 80% by weight, flexibility deteriorates. When the amount of the component (A) is less than 10% by weight, thermal resistance is poor. When the amount of the component (C) is less than 5% by weight, matte properties deteriorate. When the amount of the component (C) is more than 85% by weight, tensile modulus is poor.

According to an aspect of the present invention, there is provided a convenient method for preparing films and sheets having a good matte properties wherein a high-pressure radical polymerization process ethylene copolymer and/or a modified polyolefin-based resin as component (C) having a polar group is incorporated in a specific amount into the polymeric blend of the components (A) and (B) which have no polar group, thereby resulting in an increase in haze value owing to a great increase in heterogeneity of the phases giving good matte properties.

In this case, the MFR ratios of (A) to (B) and (A) to (C) are so adjusted that they can be within the range of 5 to 20 and 5 to 30 respectively, resulting in an increase in haze value and opalescence for the reason that a dispersion phase having a proper particle diameter which exists in a continuous crystalline phase forms, that is, a so-called sea-island structure comprising two crystalline regions different from each other in refractive index forms owing to a difference in fluidability between the molten components, thereby resulting the opalescence (an increase in haze value) caused by the scattering of light from the two regions.

Another method for preparing films and sheets having good matte properties comprises quenching a polymeric blend of component (A) and components (B)+(C) wherein the component (A) and the components (B)+(C) are different from each other in crystallization temperature to some extent, preferably by over 5° C.

In this case, a clearly distinctive interface forms between the two different microcrystalline regions of (A) and (B)+(C), thereby further increasing the difference in reflective index. By rapidly quenching, the interface forms more quickly.

Generally, a wide growth of interfaces mingled with each other between two different crystalline regions of polyolefins develops.

However, the inventors have found that by taking advantage of a difference in crystallization temperature and by rapid quenching, said wide growth of interfaces may be prevented, resulting in clearly distinctive interfaces and heterogeneity of phases, which contributes to enhance the matte properties of the films and sheets.

In the matte films and sheets prepared from the polymeric blend comprising an polyolefin-based modified resin as component (C), the adhesiveness of the resin components to an inorganic filler and/or flame retardant is reinforced, the mechanical strength is improved, and the adhesion force to metallic or plastic substrates is also improved owing to the introduction of a polar group.

In the present invention, at least one of inorganic fillers as component (D) and flame retardants (E) may be additionally incorporated into the polymeric blend comprising components (A) to (C) to improve the properties of the polymeric blend such as thermal resistance, covering power, flame resistance, chalk resistance, and the like.

The inorganic filler may be used in granular, lamellar, needle, spherical, balloon and fibrous forms, and examples of these inorganic fillers include granular fillers such as calcium carbonate, magnesium carbonate, calcium sulfate, calcium silicate, clay, diatomaceous earth, talc, alumina, siliceous sand, glass powder, iron oxide, metallic powder, $Sb_2O_3$, graphite, silicon carbide, silicon nitride, silica, boron nitride, aluminum nitride and carbon black; lamellar fillers such as mica, glass plate, sericite, pyrophyllite, aluminum flake; scaly fillers such as graphite; balloon fillers such as metallic balloon, galass balloon, SHIRASU balloon and pumice; and mineral fibers such as glass fiber, carbon fiber, graphite fiber, whisker, metallic fiber, silicon carbide fiber, asbestos, and wollastonite. The most preferred filler is calcium carbonate.

The amount of the filler as component (D) to be incorporated is in a range from 1 to 150 parts by weight, based on 100 parts by weight of the polymeric blend of a propylene polymer or copolymer as component (A), an ethylene-α-olefin copolymers as component (B) and a high-pressure radical polymerization process ethylene polymer or copolymer and/or a modified polyolefin-based resin as component (C).

When the amount exceeds the 150 parts by weight, the mechanical properties such as impact resistance, flexibility, and chalk resistance of the resulting matte films or sheets deteriorate. When the amount is less than 1 part by weight, the tensile modulus (a measure of the firmness of film), flame resistance, and covering force of the resulting matte films and sheets are not improved unpreferably.

Examples of the flame retardant as component (E) include halogen-based and phosphorus-based flame retardants and inorganic flame retardants and mixtures thereof. An organic flame retardant such as halogen-based organic flame retardant in a small amount gives a good flame resistance, and an inorganic flame retardant such as magnesium hydroxide is used preferably for the preparation of halogen-free films and sheets.

Examples of the aforesaid halogen-based flame retardants include bromine-based flame retardants such as tetrabromobisphenol A (TBA) and derivatives thereof, hexabromobenzene, decabromodiphenyl ether, tetrabromoethane (hereinafter also referred to as TBE), tetrabromobutane (TBB), hexabromocyclodecane (HBCD); chlorine-based flame retardants such as chlorinated paraffins, chlorinated diphenyls, perchloropentacyclodecane, chlorinated naphthalenes; halogen-based flame retardants such as halogenated diphenylsulfide; halogenated polystyrenes such as bromostyrene, bromopoly-α-methyl styrene and derivatives thereof; halogenated polycarbonates such as bromopolycarbonate; halogenated polyesters such as polyalkylenetetrabromoterephthalate and bromoterephthalic acid-based polyester; halogenated epoxy compounds such as halogenated bisphenol-based epoxy resins; halogenated polyphenyleneoxides such as poly(dibromophenylene oxide); halogenated polymers such as cyanuric acid esters of halogenated bisphenol compounds; and the like.

Examples of the phosphorus-based flame retardant include phosphoric acid esters, halogenated phosphoric acid esters, phosphinic acid derivatives, such as tricresyl phosphate, tri(β-chloroethyl) phosphate, tri(dichloropropyl) phosphate, tri(dibromopropyl) phosphate, 2,3-dibromopropyl-2,3-choloropropyl phosphate. Example of other flame retardants include guanidine compounds such as guanidine nitride.

The organic flame retardant may be used together with a hereinafter-described inorganic flame retardant, such as $Sb_2O_3$, zirconium oxide or zinc borate to give synergism.

The amount of the organic flame retardant is in a range from 1 to 100 parts by weight, preferably 5 to 50 parts by weight, based on 100 parts by weight of the polymeric blend.

When the amount is less than 1 parts by weight, the flame resistance of the resulting blend is poor. Inversely, when the amount is more than 100 parts by weight, the mechanical properties deteriorate and the cost goes up.

Examples of the inorganic flame retardants include aluminum hydroxide, magnesium hydroxide, zirconium hydroxide, basic magnesium carbonate, dolomite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesium-calcium carbonate, calcium carbonate, barium carbonate, magnesium oxide, molybdenum oxide, zirconium oxide, stannous oxide, $Sb_2O_3$, antimony oxides and red phosphorus. These inorganic flame retardants may be used alone or as a mixture of two or more thereof. Of these flame retardants, aluminum hydroxide, magnesium hydroxide, basic magnesium carbonate, dolomite, hydrotalcite are particularly preferred in terms of flame resistance and economics. Above all, aluminum hydroxide and magnesium hydroxide are particularly preferred.

The hydrates of inorganic metallic compounds such as aluminum hydroxide or magnesium hydroxide may be used preferably together with at least one auxiliary additive selected from the group consisting of red phosphorus, a phenol resin-coated red phosphorus, carbon black, and boric acid to accelerate the formation of char (carbonized layers).

The amount of the aforesaid accelerator to promote the formation of char is in a range from 0.5 to 20% by weight, based on the weight of the inorganic flame retardant.

The average particle diameter of the inorganic flame retardant depends on its kind, but in the cases of aluminum hydroxide and magnesium hydroxide, the average particle diameter is 20 μm or less, preferably 10 μm or less.

The inorganic flame retardant is used in an amount of 30 to 150 parts by weight, preferably 50 to 120 parts by weight, based on 100 parts by weight of the polymeric blend. When the amount of the inorganic flame retardant is less than 1 parts by weight, flame resistance of the resulting matte film or sheet is poor, and inversely, when the amount is more than 150 parts by weight, mechanical properties, flexibility and chalk resistance of the resulting matte films or sheets deteriorate.

The surface of the inorganic filler as component (D) or inorganic flame retardant as component (E) is preferably treated by use of stearic acid, oleic acid, palmitic acid or a metallic salt thereof, paraffin wax, polyethylene wax or a modified wax thereof, an organic silane, an organic borane or an organic titanate to coat the surface.

Examples of the organic silane compound include vinyl methoxysilane, vinyl triethoxysilane, vinyl acetyl silane, vinyl trichlorosilane, and the like.

Examples of the unsaturated organic titanate include tetraisopropyl titanate, tetra-n-butyl titanate, tetrakis(2-ethylhexoxy) titanate, titanium lactate ammonium salt, and the like.

When each of the components (A) to (E) is melted and blended together, various additives may be used in a small but effective amount, if necessary, insofar as they do not deviate from the gist of the present invention.

Examples of such usable additives include an antistatic additive, an anti-fog agent, an organic filler, an antioxidant, a slip agent, organic or inorganic colorant, an ultraviolet inhibitor, a dispersant, a plasticizer, a nucleating agent, a crosslinking agent.

When the polymeric blend comprises components (A) to (C), the matte film or sheet of the present invention may be prepared by extruding or molding the polymeric blend at a molding temperature of 180° to 280° C., preferably 200° to 250° C., followed by cooling the resulting film or sheet using a device having a temperature below 50° C., preferably below 30° C.

When the polymeric blend comprises components (A) to (E), the matte film or sheet of the present invention may be prepared by extruding or molding the polymeric blend at a molding temperature of 180° to 280° C., preferably 220° to 270° C., followed by cooling the resulting film or sheet to a temperature below 50° C., preferably below 30° C. When the molding temperature is 280° C. or higher, the matte properties deteriorate, and inversely, when the molding temperature is 180° C. or lower, an uneven and rough surface is obtained. When the cooling device temperature is 50° C. or higher, a film or sheet having a surface gloss (60°) of 30% or more is obtained. The preferred gloss (60°) is 20% or less.

Any method may be employed, but a conventional molding method such as calendaring, inflation technique, T-die technique, and the like may be preferably employed. Above all, the polymeric blend comprising components (A) to (E) is preferably molded by T-die technique at a molding temperature of 180° to 280° C. to provide a film or sheet, followed by contacting the resulting film or sheet with a matte roll and a touch roll cooled to a temperature below 50° C.

The matte roll is one of embossing rolls, and any conventional embossing roll may be employed. Any conventional touch roll may be employed, but a roll with a layer having a Shore hardness (HS) of 70 to 90 and made of a synthetic rubber such as silicon rubber or NBR is employed preferably to prevent the sticking of film to the roll surface.

The following Examples will illustrate the present invention, which by no means limit the invention.

EXAMPLE

The following are the components (A) to (E) used in Examples and Comparative Examples in the present invention.

Component (A):
A1: Polypropylene
  [Density=0.905 g/cm$^3$, MFR=8 g/10 min, crystallization temperature=117° C.; NISSEKI POLYPRO J 650 G, a product of Nippon Petrochemicals Co., Ltd.]
A2: Polypropylene
  [Density=0.905 g/cm$^3$, MFR=8 g/10 min, crystallization temperature=117° C.; NISSEKI POLYPRO J 150 G, a product of Nippon Petrochemicals Co., Ltd.]
A3: Polypropylene
  [Density=0.905 g/cm$^3$, MFR=8 g/10 min, crystallization temperature=110° C.; NISSEKI POLYPRO J 350 G, a product of Nippon Petrochemicals Co., Ltd.]
A4: Polypropylene
  [Density=0.905 g/cm$^3$, MFR=2 g/10 min, crystallization temperature=104° C.; NISSEKI POLYPRO J 420 G, a product of Nippon Petrochemicals Co., Ltd.]

Component (B):
The following ethylene 1-butene copolymers (EαO) were obtained by copolymerization of ethylene and 1-butene in the presence of a catalyst comprising AlEt$_3$ and a solid catalyst component obtained from anhydrous MgCl$_2$, 1,2-dichloroethane and TiCl$_4$.

B1: EαO
  [Density=0.900 g/cm$^3$, MFR=0.5 g/10 min, crystallization temperature=102° C., Tm=118° C., 1-butene content=10% by mole, insolubles in boiling hexane=60% by weight]

Component (C):
C1: Low-density polyethylene by a high-pressure radical polymerization process
  [Density=0.922 g/cm$^3$, MFR=1.0 g/10 min crystallization temperature=107° C.; NISSEKI REXRON F 22, a product of Nippon Petrochemicals Co., Ltd.]
C2: EVA by a high-pressure radical polymerization process
  [Density=0.929 g/cm$^3$, MFR=0.3 g/10 min, crystallization temperature=94° C.; NISSEKI REXRON V141, a product of Nippon Petrochemicals Co., Ltd.]
C3: EEA by a high-pressure radical polymerization process
  [Density=0.929 g/cm$^3$ MFR=0.3 g/10 min, crystallization temperature=90° C.; NISSEKI REXRON V1040, a product of Nippon Petrochemicals Co., Ltd.]
C4: Maleic anhydride-modified ethylene-1-butene copolymer (hereinafter referred to as MAnLLDPE)
  [Density=0.92 g/cm$^3$, MFR=1.2 g/10 min, crystallization temperature=105° C., MAn content= 0.2% by weight, PO=0.05% by weight; a product of Nippon Petrochemicals Co., Ltd.]

Component (D):
D1: Calcium carbonate

Component (E):
E1: Tetrabromobisphenol A (TBA) [Firegard, a product of Teijin-Kasei Co., Ltd.]
E2: Magnesium hydroxide (Kisuma 5B, a product of Kyowa Chemical Co., Ltd.]

The following are the method for measuring Tm by DCS and the method for determining $C_6$ insoluble content in the present invention:

Measurement of Tm by DSC:
About 5 mg of a specimen is weighed from a hot-pressed 100 μm thick film. Then, it is set on a differential scanning calorimeter. The temperature is raised to 170° C., at which temperature the specimen is held for 15 minutes. Thereafter, the specimen is cooled to 0° C. at a rate of 2.5° C./min. Next, from this state the temperature is raised to 170° C. at a rate of 10° C./min. The temperature at the vertex position of the maximum peak out of peaks which appeared during the heat-up period from 0° C. to 170° C. is regarded as Tm.

$C_6$ insolubles content:
A 200 μm thick sheet is formed using a hot press, from which are cut out three 20 mm×30 mm sheets. Using these sheets, extraction is made in boiling n-hexane for 5 hours by means of a double tube type Soxhlet extractor. Then, the insolubles are taken out and vacuum-dried (50° C., 7 hours), and thereafter $C_6$ insolubles content is calculated in accordance with the following equation:

$C_6$ insolubles content(wt. %)= (Sheet wt. after extraction)/ (Sheet wt. before extraction) ×100

Molding Apparatus and Conditions:
Extruder: a product of Tanabe Kikai Co., Ltd., a cylinder bore of 50 mm, a screw L/D ratio of 22, a coat hanger die of 600 mm in width, a lip gap of 1.0 mm, roll cooling
Extrusion temperature:
230° C. (cylinder temperature=230° C., T-die temperature=230° C.)
Metallic matte roll:
Touch roll: Silicon rubber roll (Shore hardness=80°)
Cooling temperature: 25° C. metallic matte roll
Rate of film making: 5 m/min
Thickness of film: 100 μm Using the films and sheets prepared from the polymeric blends as shown in Table, the properties of the films or sheets were measured by the following methods.
Density: JIS K 6758
MFR: JIS K 6758

Crystallization Temperature: JIS K 7121
Haze: ASTM D 1003
Gloss: JIS Z 8741
Yield Strength: JIS K 6758
Tensile Strength at Break: JIS K 6758
Elongation at Break: JIS K 6758
Tensile Strength: ASTM D 1922-61 T
Tensile Modulus: Specimen: 350 mm (L)×20 mm(W) Speed of testing: 20 mm/min Distance between grips: 250 mm Speed of chart: 1000 mm/min Tensile modulus was determined from a load (P) corresponding to 1% deformation of the film.

Chalking by folding:

The extent of chalking of the specimen after folding was classified by visual inspection into three ranks.

O: no chalking
Δ: a little chalking
x: chalking

Covering Power:

The visibility through the specimen was classified by visual inspection into two ranks:

O: not visible
x: visible

Erichsen Test: According to JIS K 6744

O: no delamination
Δ: a little delamination
x: delamination

Erichsen (initial): Conducted immediately after lamination.

Erichsen (after boiling):
Conducted after immersion in boiling water for 60 min, followed by rapid quenching by cold water.

Erichsen (cold): Conducted under a temperature below 5° C.

Examples 1 to 14, Comparative Examples 1 to 5

In Examples 1 to 14, the propylene polymer or copolymer as component (A), the EαO as component (B), the high-pressure radical polymerization process low-density polyethylene, the high-pressure process ethylene copolymer, or the modified polyolefin resin as component (C), the inorganic filler as component (D), and the flame retardant as component (E) were used. The results are set forth in Table 1.

In comparative Examples 1 to 5, properties of the films are set forth in order to clarify the effect of a change in the composition of the polymeric blend. The results are set forth in the same Table 1.

TABLE 1

| | EXAMPLE | | | | | | | | | |
|---|---|---|---|---|---|---|---|---|---|---|
| | 1 | 2 | 3 | 4 | 5 | 6 | 7 | 8 | 9 | 10 |
| Component (A) (wt %) | | | | | | | | | | |
| A1: PP (J650G) | — | — | — | — | — | — | — | — | — | 63.6 |
| A2: PP (J150G) | 70 | 15 | — | — | 50 | 70 | 60 | 60 | — | — |
| A3: PP (J350G) | — | — | 20 | 70 | — | — | — | — | 60 | — |
| A4: PP (J420G) | — | — | — | — | — | — | — | — | — | — |
| Component (B) (wt %) | | | | | | | | | | |
| B1: VLDPE | 15 | 15 | 10 | 15 | 25 | 15 | 25 | 25 | 25 | 27.3 |
| Component (C) (wt %) | | | | | | | | | | |
| C1: LDPE (F22) | — | — | — | — | — | 15 | — | — | — | — |
| C2: EVA (V141) | 15 | 70 | 70 | — | 25 | — | — | — | — | — |
| C3: EEA (A1040) | — | — | — | 15 | — | — | — | — | — | — |
| C4: MAnLLDPE | — | — | — | — | — | — | 15 | 15 | 15 | 9.1 |
| Component (D) (parts by weight) | | | | | | | | | | |
| D1: Ca-carbonate | — | — | — | — | — | — | — | 20 | — | 20 |
| Component (E) (parts by weight) | | | | | | | | | | |
| E1: TBA | — | — | — | — | — | — | — | 7 | — | 5 |
| E2: Mg(OH)$_2$ | — | — | — | — | — | — | — | — | 100 | — |
| MFR Ratio (A MFR/B MFR) | 16 | 16 | 16 | 16 | 16 | 16 | 16 | 16 | 16 | 16 |
| Difference in Crystalline Temp. | | | | | | | | | | |
| (Δ T °C. (A,B)) | 15 | 15 | 8 | 8 | 15 | 15 | 15 | 15 | 8 | 15 |
| (Δ T °C. (A,C)) | 23 | 23 | 16 | 20 | 23 | 10 | 12 | 12 | 5 | 12 |
| Tensile Strength at Break (Kgf/cm$^2$) | 275 | 215 | 225 | 265 | 250 | 290 | 255 | 270 | 245 | 380 |
| Yield Strengthk (Kgf/cm$^2$) | 220 | 110 | 100 | 180 | 200 | 230 | 210 | 200 | 160 | 195 |
| Elongation at Break (%) | 510 | 490 | 510 | 500 | 495 | 500 | 530 | 470 | 350 | 710 |
| Tensile Modulus (Kgf/cm$^2$) | 4350 | 2830 | 2640 | 4030 | 3110 | 4500 | 4000 | 4200 | 4500 | 4000 |
| Tear Strength (g) | 320 | 445 | 432 | 333 | 376 | 300 | 400 | 250 | 250 | 290 |
| Gloss (%) | 5 | 7 | 10 | 4 | 6 | 6 | 5 | 3 | 3 | 3.3 |
| Haze (%) | 73 | 70 | 68 | 75 | 71 | 71 | 74 | 77 | 78 | >95 |
| Chalking (by folding) | | | | | | | | | | O |
| Covering Power | | | | | | | | | | O |
| Erichsen (initial) | | | | | | | | | | O |

TABLE 1-continued

|  | | | | | | | | | |
| --- | --- | --- | --- | --- | --- | --- | --- | --- | --- |
| Erichsen (after boiling) | | | | | | | | | ○ |
| Erichsen (cold) | | | | | | | | | ○ |

| | EXAMPLE | | | | COMPARATIVE EXAMPLE | | | | |
| --- | --- | --- | --- | --- | --- | --- | --- | --- | --- |
| | 11 | 12 | 13 | 14 | 1 | 2 | 3 | 4 | 5 |
| Component (A) (wt %) | | | | | | | | | |
| A1: PP (J650G) | 27.3 | 63.6 | 63.6 | 63.6 | — | — | 100 | — | 70 |
| A2: PP (J150G) | — | — | — | — | 75 | — | — | 100 | — |
| A3: PP (J350G) | — | — | — | — | — | — | — | — | — |
| A4: PP (J420G) | — | — | — | — | — | 70 | — | — | — |
| Component (B) (wt %) | | | | | | | | | |
| B1: VLDPE | 63.6 | 27.3 | 27.3 | 27.3 | — | 30 | — | — | 30 |
| Component (C) (wt %) | | | | | | | | | |
| C1: LDPE (F22) | — | — | — | — | — | — | — | — | — |
| C2: EVA (V141) | — | — | — | — | 25 | — | — | — | — |
| C3: EEA (A1040) | — | — | — | — | — | — | — | — | — |
| C4: MAnLLDPE | 9.1 | 9.1 | 9.1 | 9.1 | — | — | — | — | — |
| Component (D) (parts by weight) | | | | | | | | | |
| D1: Ca-carbonate | 20 | 50 | 140 | — | — | — | — | — | — |
| Component (E) (parts by weight) | | | | | | | | | |
| E1: TBA | 5 | 5 | 5 | — | — | — | — | — | — |
| E2: Mg(OH)$_2$ | — | — | — | 100 | — | — | — | — | — |
| MFR Ratio (A MFR/B MFR) | 16 | 16 | 16 | 16 | — | 4 | — | — | 16 |
| Difference in Crystalline Temp. | | | | | | | | | |
| (Δ T °C. (A,B)) | 15 | 15 | 15 | 15 | — | 2 | — | — | 15 |
| (Δ T °C. (A,C)) | 12 | 12 | 12 | 12 | 23 | — | — | — | — |
| Tensile Strength at Break (Kgf/cm$^2$) | 275 | 360 | 250 | 290 | 300 | 280 | 450 | 500 | 370 |
| Yield Strength (Kgf/cm$^2$) | 110 | 175 | 135 | 150 | 220 | 190 | 290 | 380 | 220 |
| Elongation at Break (%) | 750 | 600 | 350 | 470 | 480 | 580 | 640 | 650 | 670 |
| Tensile Modulus (Kgf/cm$^2$) | 2000 | 4750 | 8900 | 6700 | 4600 | 3480 | 7000 | 8500 | 3000 |
| Tear Strength (g) | 330 | 230 | 210 | 230 | 200 | 210 | 120 | 70 | 150 |
| Gloss (%) | 3.0 | 2.5 | 1.8 | 2.0 | 45 | 30 | 40 | 60 | 15 |
| Haze (%) | >95 | >95 | >95 | >95 | 35 | 20 | >95 | 41 | >95 |
| Chalking (by folding) | ○ | Δ | Δ | Δ | | | X | ○ | Δ |
| Covering Power | ○ | ○ | ○ | ○ | | | X | X | X |
| Erichsen (initial) | ○ | ○ | ○ | ○ | | | X | X | Δ |
| Erichsen (after boiling) | ○ | ○ | ○ | ○ | | | X | X | X |
| Erichsen (cold) | ○ | Δ | Δ | Δ | | | X | X | X |

The polyolefin-based matte films or sheets of the present invention can be prepared from a polymeric blend comprising a propylene polymer or copolymer as component (A) and a specific ethylene-α-olefin copolymer (EαO, so-called "super low-density polyethylene") as component (B). The polymeric blend may further comprise a high-pressure radical polymerization process ethylene polymer or copolymer and/or a graft modified polyolefin-based resin as component (C). The above polymeric blend may further comprise an inorganic filler as component (D) and a flame retardant as component (E). It will be apparent from the above description and Examples that the matte films or sheets of the present invention are excellent in tensile modulus, flexibility, impact resistance, thermal resistance, laminating properties, flame resistance, chalking resistance, covering power, scratch resistance, and can be widely used for fabricating adhesive tapes, covers or cases for stationery, fashion bags, sheets for interior finish work in construction and automobile industries, and sheets for dressing steel plates.

What is claimed is:

1. A matte film or sheet formed of a polymeric blend comprising, 10 to 80% by weight of component (A): a propylene polymer or copolymer having a MFR of 1~20 g/10 min., 5 to 30% by weigh of component (B): an ethylene-α-(C$_{3-12}$ olefin) copolymer satisfying the following conditions (I) to (IV):

(I) a density of 0.860 to 0.910 g/cm$^3$;

(II) a maximum peak temperature of not lower than 100° C. as measured by DSC (differential scanning calorimetry);

(III) an insoluble in boiling n-hexane content of not lower than 10% by weight; and (IV) a MFR of 0.1~2 g/10 min.; and 5 to 85% by weight of component (C): at least one component having a MFR of 0.1~2.0 g/10 min. which is a polyolefin graft modified resin of at least one grafting monomer selected from the group consisting of a) carboxylic acid group-, carboxylic acid ester group- or carboxylic acid anhydride group-containing monomers, b) epoxy group-containing monomers, c) hydroxyl group-containing monomers, d) amino group-containing monomers, and e) alkenyl cyclic imino ether derivative monomers, wherein the ratio of component (A) MFR to component (B) MFR is from 5 to 20, the ratio of component (A) MFR to component (C) MFR is from 5 to 30 and the difference in crystalline temperature of component (A) and component (B) and also component (A) and component (C) is not less than 5° C., and wherein said matte film or sheet has a gloss (60°) of not more than 20%.

2. A matte film or sheet according to claim 1, wherein said component (A) is a propylene-ethylene block copolymer having a MFR of 5~10 g/10 min and said component (B) has an α-olefin content of 5~40 mole %, a density of 0.880 to 0.905 g/cm$^3$ and an insoluble in boiling n-hexane content of 20~95% by weight.

3. A matte film or sheet according to claim 1, wherein said component (C) is a copolymer of maleic anhydride and an ethylene-1-butene copolymer.

4. A matte film or sheet according to claim 1, wherein said component (A) is polypropylene, said component (B) is an ethylene/1-butene copolymer and said component (C) is a copolymer of maleic anhydride and an ethylene-1-butene copolymer.

5. A matte film or sheet according to claim 1, wherein said polymeric blend further comprises 1 to 150 parts by weight of at least one component selected from the group consisting of inorganic filler (D) and flame retardant (E), on the basis of 100 parts by weight of said components (A)+(B)+(C).

6. A matte film or sheet according to claim 5, wherein said inorganic filler as component (D) is calcium carbonate.

7. A matte film or sheet according to claim 5, wherein said flame retardant is an organic flame retardant.

8. A matte film or sheet according to claim 7, wherein said flame retardant is tetrabromobisphenol A.

9. A matte film or sheet according to claim 5, wherein said flame retardant is an inorganic flame retardant.

10. A matte film or sheet according to claim 9, wherein said flame retardant is magnesium hydroxide.

11. A method for the preparation of a matte film or sheet according to claim 1 comprising molding a polymer blend of components (A), (B) and (C) at 180°~280° C. to provide a film or sheet and cooling the resulting film or sheet by contact with a surface which has a temperature below 50° C. and recovering a film or sheet having a gloss (60°) of not more than 20%.

* * * * *